United States Patent
Niebling et al.

(10) Patent No.: US 6,978,866 B2
(45) Date of Patent: Dec. 27, 2005

(54) WHEEL BEARING WITH BRAKE DISK

(75) Inventors: Peter Niebling, Bad Kissingen (DE); Heinrich Hofmann, Schweinfurt (DE); Jens Heim, Schweinfurt (DE); Horst Masuch, Schweinfurt (DE)

(73) Assignee: FAG Kugelfischer AG, (DE)

( * ) Notice: Subject to any disclaimer, the term of this patent is extended or adjusted under 35 U.S.C. 154(b) by 0 days.

(21) Appl. No.: 10/745,418

(22) Filed: Dec. 22, 2003

(65) Prior Publication Data

US 2004/0134720 A1    Jul. 15, 2004

(51) Int. Cl.$^7$ ............................................. F16D 65/12
(52) U.S. Cl. ............................. 188/18 A; 188/218 XL; 301/6.8
(58) Field of Search ..................... 188/18 A, 218 XL, 188/264 A, 264 AA, 73.2, 18 R; 384/544; 301/6.91, 6.8, 6.3, 35.621, 35.623, 35.626, 301/105.1, 63.107, 63.108; D12/180

(56) References Cited

U.S. PATENT DOCUMENTS 5,921,633 A * 7/1999 Neibling et al. ............. 301/6.1
6,076,896 A * 6/2000 Bertetti et al. ............. 301/105.1
2004/0016611 A1 * 1/2004 Hofmann et al. ..... 188/218 XL

FOREIGN PATENT DOCUMENTS

DE         019652464 A1  *  6/1998
DE         10260467      *  7/2004
EP         001245852 A2  * 10/2002

OTHER PUBLICATIONS

STIC translation for EP1245852A2.*
STIC tranlstaion for DE19652464A1.*

* cited by examiner

Primary Examiner—Douglas C. Butler
(74) Attorney, Agent, or Firm—Ostrolenk, Faber, Gerb & Soffen, LLP

(57) ABSTRACT

Wheel-bearing and brake-disk unit designed such that forces (deformations) when the rim is being screwed on largely avoid resulting axial run-out in the brake disk. The bearing flange to which the rim and pot-shaped part of the brake disk are attached has first fastening openings and a larger diameter in the regions of the first openings and a smaller diameter between adjacent first openings. The pot-shaped part of the brake disk has second fastening openings and a larger diameter in the regions of the second openings and a smaller diameter between adjacent second openings.

7 Claims, 4 Drawing Sheets

WHEEL BEARING WITH BRAKE DISK

FIELD OF THE INVENTION

The invention relates to the design of the flange of the wheel bearing and of the brake disk in motor vehicles.

BACKGROUND OF THE INVENTION

In motor vehicles, the problem of brake squeal or brake rubbing has been known for a long time. In order to solve this problem, a wide variety of approaches has been adopted hitherto. The problem of brake squeal manifests itself in the fact that vibrations combined with noise generation, which are harmful and are perceived as unpleasant, occur during the braking action. In investigations in which the elastic deformation of the brake disk was measured in order to establish the causes of the brake squeal, it was found that the tightening torque of the screws with which the rim is fastened has an effect on the axial run-out of the brake disk. When the rim is fastened to the wheel bearing unit, the fastening screws are passed through the pot-shaped central region of the disk brake and are screwed in the rotating flange of the wheel bearing into a thread. When the screws are fastened, the rim is supported on the pot-shaped fastening region of the brake disk and this deforms this region elastically and partly also plastically. These deformations lead to an axial run-out in the brake disk. Since the screws are often tightened to a different extent in practice, axial forces of different magnitude act on the pot-shaped fastening region of the brake disk and thus lead to different axial "run-outs" in the brake disk. These axial run-outs lead to an elastic deformation of the brake disk and thus influence the brake squeal.

In DE 196 52 464 A1, a brake disk with pot-shaped fastening part is shown in FIG. 7. The recesses in the pot-shaped region of the brake disk serve for optimized cooling and do not solve the problem of the axial run-out in the brake disk.

A brake disk with pot-shaped fastening part is shown in DE 10113541 A1, this brake disk having different diametral regions in the fastening part. These different diametral regions do not solve the problem of the axial run-out in the brake disk, since the fastening part is not stiffened in the axial direction.

OBJECT OF THE INVENTION

The object of the invention is therefore to arrange the brake disk with pot-shaped fastening part and the flange of the wheel bearing in such a way that the loads due to the screw forces have virtually no effect on the axial run-out of the brake disk during the fastening of the rim.

SUMMARY OF THE INVENTION

This object is achieved by a wheel-bearing and brake-disk unit comprising the following features and elements.

There is a rolling-contact bearing including an outer ring with an outwardly projecting flange thereon. First fastening openings are spaced around the flange for fastening thereto of a wheel rim and a pot-shaped fastening part of a brake disk. The flange has a first smaller outside diameter between each two adjacent first fastening openings and a second larger outside diameter in the regions of the first fastening openings therein.

A flat brake disk includes a pot-shaped fastening part at a central region of the brake disk. Second fastening openings are formed in the pot-shaped part. The outside diameter of the pot-shaped fastening part between each two adjacent second fastening openings is smaller than the outside diameter of the fastening part in the region of the second fastening openings.

The essence of the invention consists in the fact that regions having different diameters are arranged at the pot-shaped fastening part of the brake disk and also at the flange of the wheel bearing. In this case, a larger diameter is provided in the region of the fastening openings of the flange and of the pot-shaped fastening part than in the region between two adjacent fastening openings. Stiffened regions are formed in the transition region between the two diametral regions in the pot-shaped fastening part of the brake disk. The configuration of the different diametral regions permits stiffened transition regions in virtually any desired position. Due to this angular position, the direction of the flow of force can be influenced in a specific manner, thereby permitting as uniform an introduction of the axial forces as possible in the region of the pot-shaped fastening part of the brake disk.

This stiffening leads to a markedly smaller axial run-out of the brake disk when the screws of the rim are being tightened. Further optimization of the pot-shaped fastening part of the brake disk with the offset planes consists in the fact that recesses are incorporated with which the flow of force in the pot-shaped fastening part of the brake disk is additionally influenced. The recesses enable the flow of force to be directed onto the stiffening elements in a specific manner. The recesses in the pot-shaped fastening part of the brake disk between the fastening openings of the brake disk ensure that there is no direct connection between the force-initiating point and the brake disk, which direct connection would lead to a higher axial run-out. In the solution according to the invention, these forces are introduced obliquely into the brake disk via the obliquely arranged stiffening ribs which result from the two planes. The recesses therefore lead to an interruption in the direct direction of the flow of force. A positive secondary effect of these recesses consists in the fact that the weight of the pot-shaped fastening part of the brake disk is additionally reduced by these recesses, which has advantages in terms of lightweight construction.

DETAILED DESCRIPTION OF THE PREFERRED EMBODIMENTS

Figure 1:
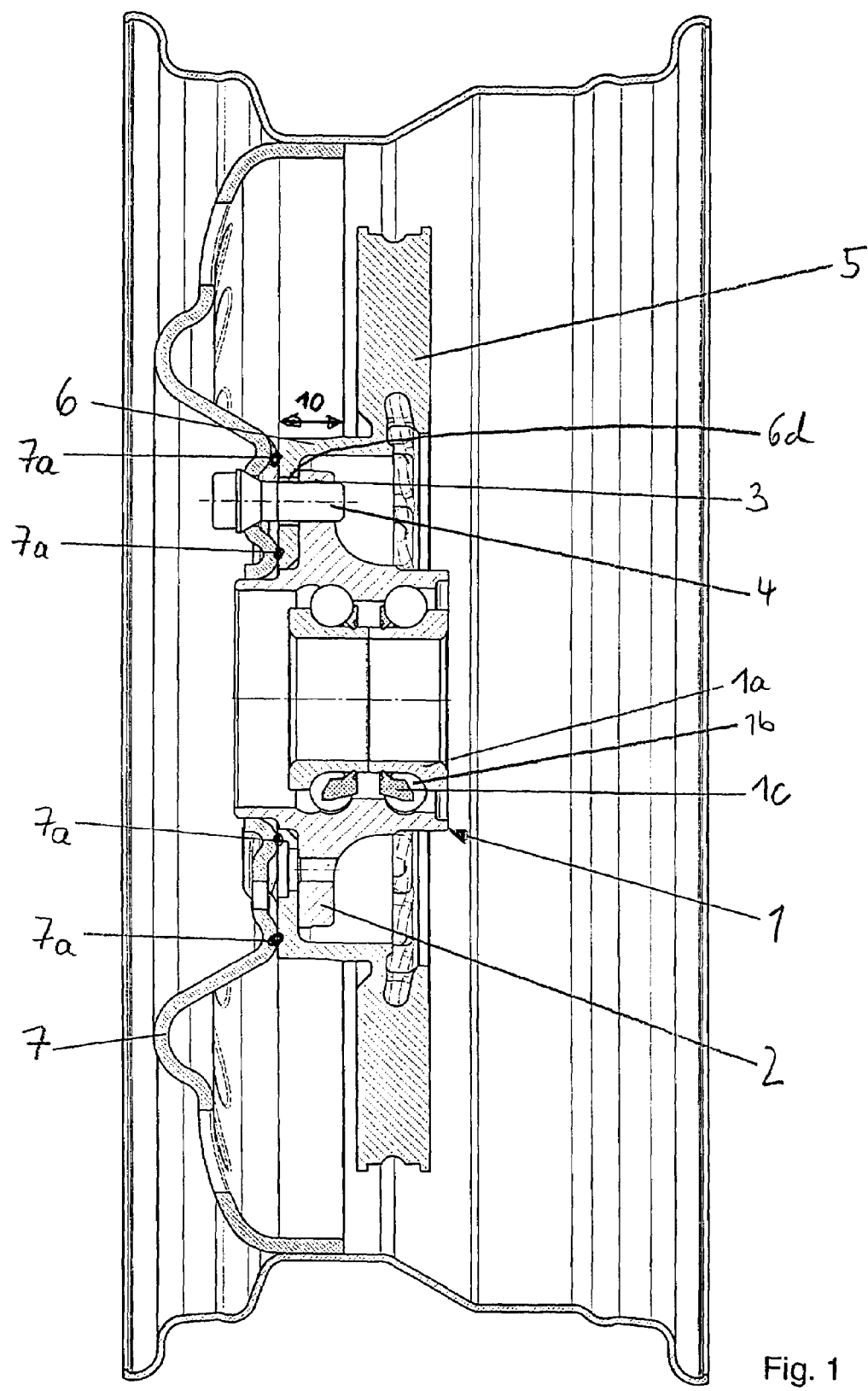
FIG. 1 shows a section through the complete system consisting of rim, brake disk and wheel bearing according to the prior art.

A complete prior art system comprising wheel bearing or rolling-contact bearing 1, flat brake disk 5 with pot-shaped fastening part 6, the rim 7 and the fastening screws 4 is shown in section in FIG. 1. In this case, the wheel bearing or rolling-contact bearing 1 comprises the inner rings 1a, the rolling-contact bodies 1b and the cage 1c. Integrated on the rotating outer ring of the wheel bearing 1 is the flange 2, which has first fastening openings 3 for accommodating screws 4. The appropriate solution with stud bolts for accommodating the rim is not shown in the drawing. The rim 7 is thus screwed into the first fastening openings 3 of the flange 2 by the screws 4, which project through the second fastening openings 6d in the pot-shaped region 6 and into the openings 3. There are contact points 7a of the rim 7 on the brake disk 5. The rim is in linear contact, which is essentially defined around the fastening screws 4. This linear contact around the screw 4 leads to axial stresses around the screw 4, which then manifest themselves in axial run-outs in the brake disk 5. The arrow 10 identifies the axial flow of force around the region of the screw 4. This axial flow of force leads to the axial run-out of the brake disk 5. As in this example, if the rim 7 is connected by five fastening screws 4 to the wheel bearing via the pot-shaped fastening region of the brake disk, this type of fastening 5 produces axial run-outs in the region of the brake disk.

Figure 2:
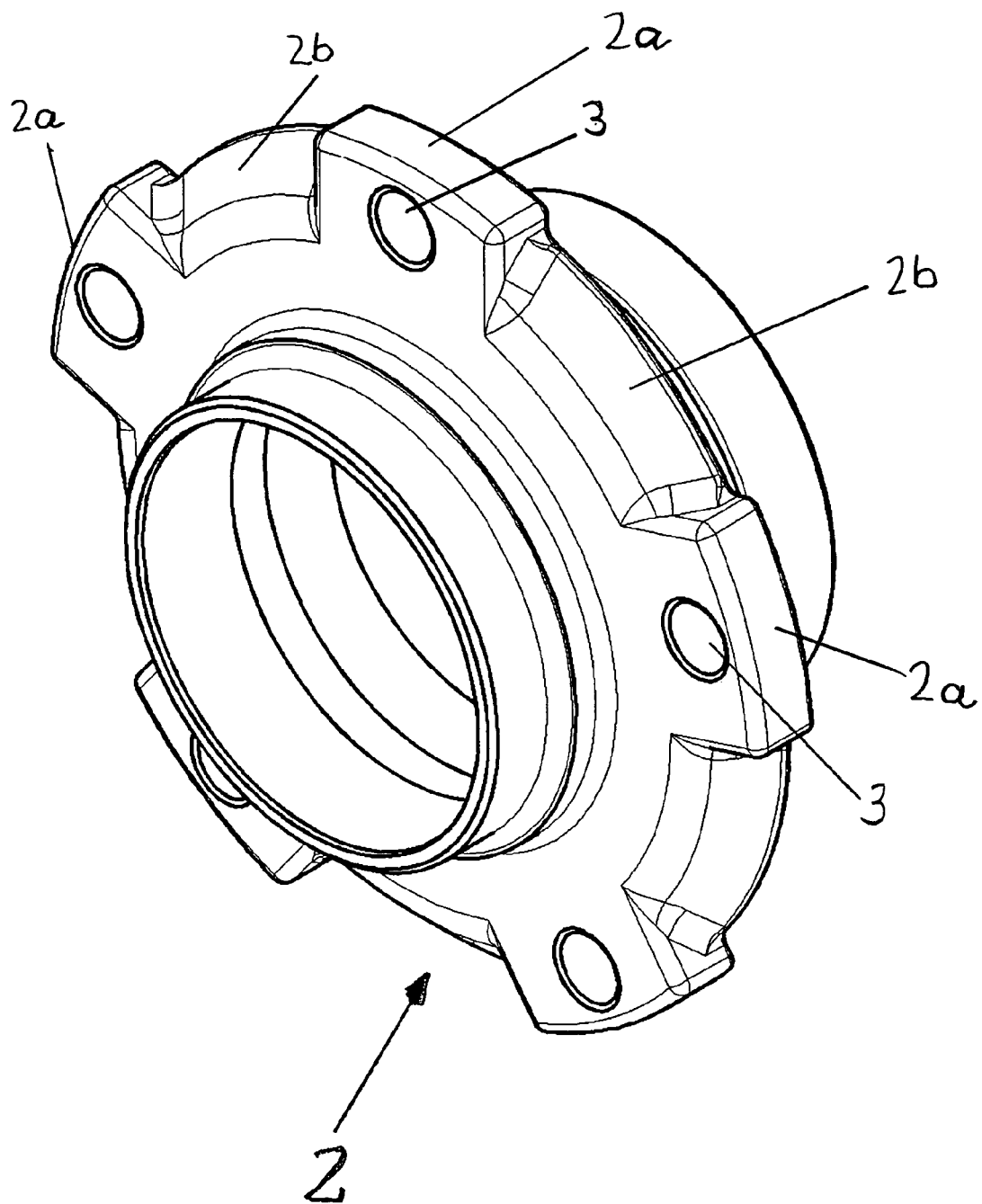
FIG. 2 shows the flange according to the invention of the wheel bearing in a three-dimensional representation.

The outer ring 2 of the wheel bearing with an integrated flange according to the invention is shown in FIG. 2. Whereas the flange in FIG. 1 in the prior art has a constant outside diameter, the flange according to the invention has different diameter regions. A smaller diameter region 2b of the flange is provided between the first fastening openings 3 which are in the larger diameter regions 2a. The region 2b shown has a uniform diameter over large segments. Not shown are equivalent solutions in which the region 2b is of concave design in order to be able to accommodate the pot-shaped fastening part of the brake disk according to the invention.

Figure 3:
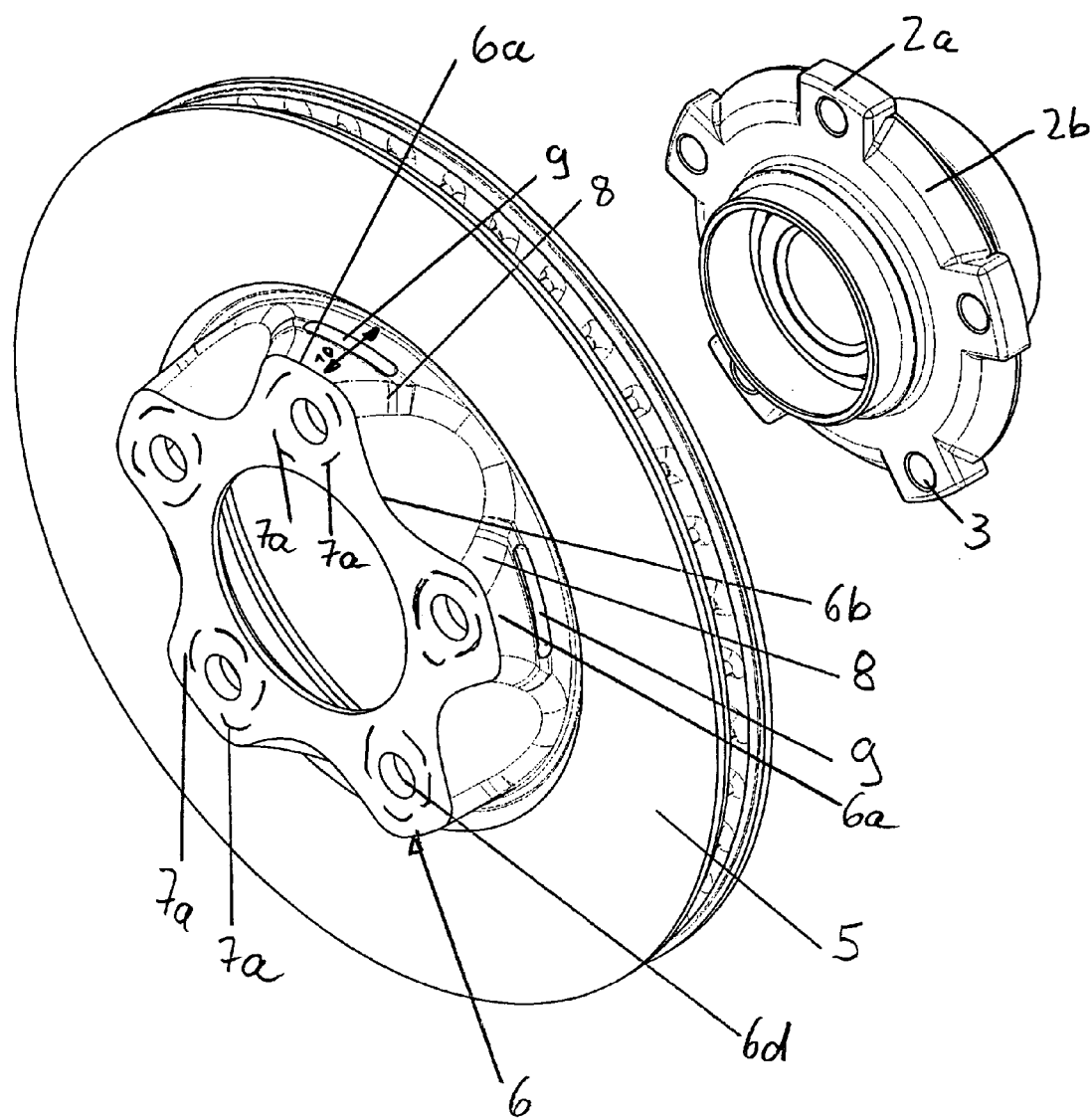
FIG. 3 shows the brake disk according to the invention with pot-shaped fastening part in a three-dimensional, exploded, oblique representation.

An embodiment of the brake disk 5 according to the invention with a pot-shaped fastening part 6 is shown in FIG. 3. The first larger diameter regions of the pot 6a are arranged in the regions of the second fastening openings 6d. Between two adjacent second fastening openings 6d, the diameter region of the pot-shaped region is drawn radially inward defining a recess or hollow. Not shown is an equivalent variant in which this region drawn inward has a largely uniform diameter, that is it is approximately circular segment. The transitions between each region 6a and the adjacent region 6b form the stiffening ribs 8. In this example, the stiffening ribs 8 have the shape of a semicircle. A straight or oblique arrangement of the stiffening ribs is not shown. In addition, in this Figure, recesses 9 are provided in the regions 6a. These recesses 9 prevent a direct flow of force from the linear contact 7a of the abutting rim 7 to the brake disk 5. These recesses 9 are intended to specifically direct the forces to the stiffening ribs 8. In this Figure, the recesses 9 run right up to the edge of the stiffening ribs. Not shown is a design in which these recesses 9 are selected to be so large that they project right into the stiffening ribs 8.

Figure 4:
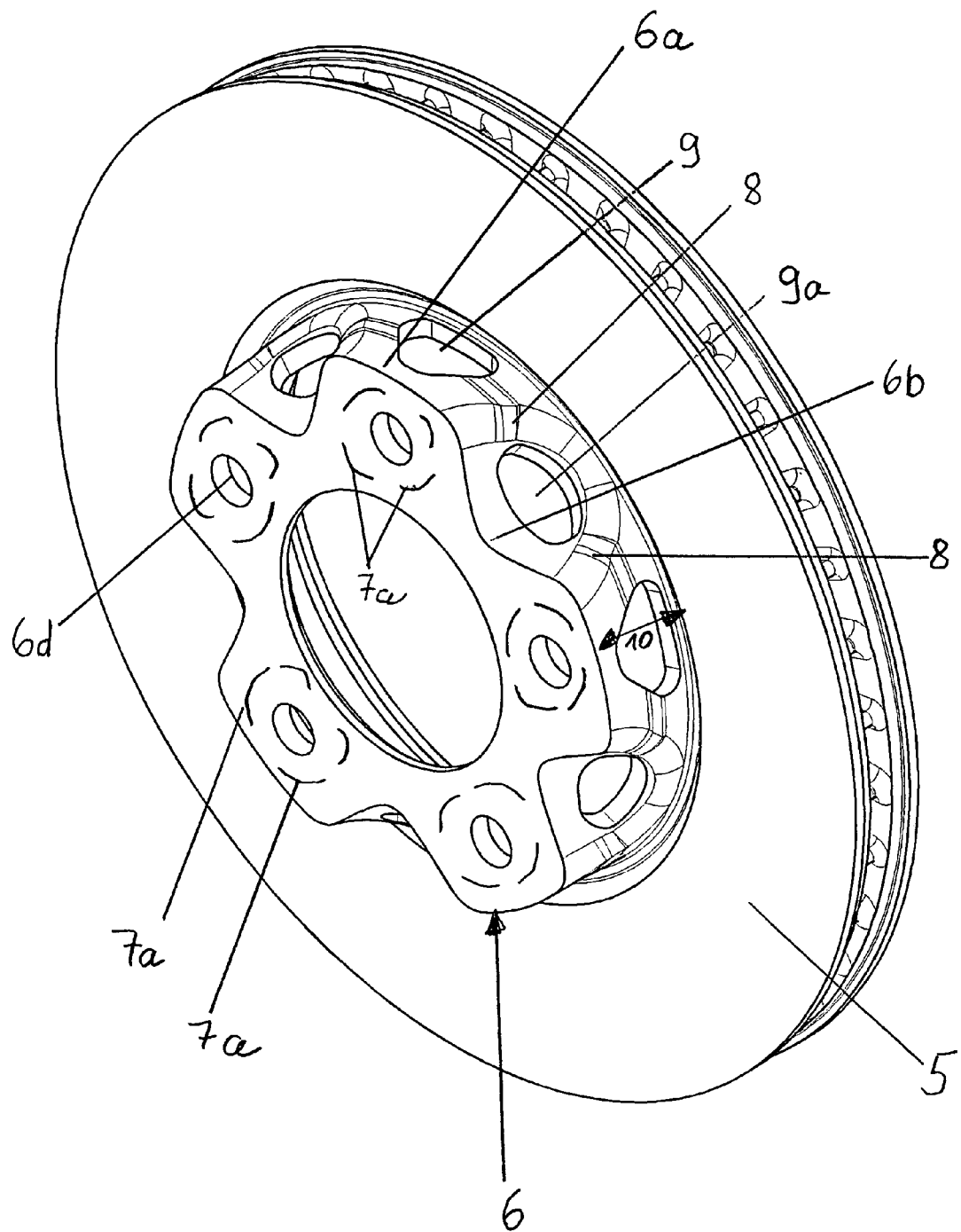
FIG. 4 shows a variant of the brake disk according to the invention with pot-shaped fastening part in a three-dimensional oblique representation.

A variant embodiment of FIG. 3 is shown in FIG. 4. The essential difference of FIG. 4 compared with FIG. 3 is that, in addition to the recesses 9 (designed differently here) which lie in the regions of the diameter regions 6a, additional recesses 9a are arranged in the regions 6b offset radially inward. The recesses 9 therefore lie radially further outward than the recesses 9a. The recesses 9a have two functions. They are intended on the one hand to influence the direction of the flow of force in the pot-shaped fastening part 6 of the brake disk 5, so that this flow of force is directed toward the stiffening ribs 8, and, on the other hand, these recesses 9a have the additional function of reducing the weight of the pot-shaped fastening part of the brake disk.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel-bearing and brake-disk unit comprising:
a rolling-contact bearing including an outer ring with an outwardly projecting flange thereon; first fastening openings spaced around the flange for fastening thereto of a wheel rim and of a pot-shaped fastening part of a brake disk; the flange has a first smaller outside diameter between each two adjacent first fastening openings and a second larger outside diameter in regions of the flange having the first fastening openings;
a flat brake disk including a pot-shaped fastening part at a central region of the brake disk; second fastening openings in the pot-shaped fastening part, the pot-shaped fastening part has an outside diameter between each two adjacent second fastening openings which is smaller than an outside diameter of the fastening part in the region of the second fastening openings and
fasteners for fastening the wheel rim to the rolling-contact bearing and to the flat brake disk, each of the fasteners extending through the rim, a respective one of the first fastening openings of the rolling-contact bearing, and a respective one of the second fastening openings of the pot shaped fastening part of the flat brake disk.

2. The wheel-bearing and brake-disk unit as claimed in claim 1, further comprising recesses defined between the second fastening openings and the flat brake disk.

3. The wheel-bearing and brake-disk unit as claimed in claim 1, further comprising stiffening regions formed in the pot-shaped fastening part between the regions around the pot-shaped fastening part having different outside diameters.

4. The wheel-bearing and brake-disk unit as claimed in claim 3, further comprising recesses defined between the second fastening openings and the flat brake disk.

5. The wheel-bearing and brake-disk unit as claimed in claim 4, wherein the recesses are in the region of the second fastening openings of the pot-shaped fastening part and extend into the stiffening region.

6. The wheel-bearing and brake-disk unit as claimed in claim 5, further comprising second recesses lying in the regions between each two adjacent second fastening openings in the pot-shaped fastening part.

7. The wheel-bearing and brake-disk unit as claimed in claim 4, further comprising second recesses lying in the regions between each two adjacent second fastening openings in the pot-shaped fastening part.

* * * * *